US011951896B2

(12) United States Patent
Toth

(10) Patent No.: US 11,951,896 B2
(45) Date of Patent: Apr. 9, 2024

(54) MOBILE PIZZA CART

(71) Applicant: Attila Toth, Phoenix, AZ (US)

(72) Inventor: Attila Toth, Phoenix, AZ (US)

( * ) Notice: Subject to any disclaimer, the term of this patent is extended or adjusted under 35 U.S.C. 154(b) by 446 days.

(21) Appl. No.: 17/507,600

(22) Filed: Oct. 21, 2021

(65) Prior Publication Data

US 2023/0127107 A1 Apr. 27, 2023

(51) Int. Cl.
| | |
|---|---|
| *B60P 3/025* | (2006.01) |
| *A21B 1/52* | (2006.01) |
| *A21D 13/22* | (2017.01) |
| *A21D 13/41* | (2017.01) |
| *B60D 1/01* | (2006.01) |
| *F24C 1/16* | (2021.01) |

(52) U.S. Cl.
CPC ............. *B60P 3/0257* (2013.01); *A21B 1/52* (2013.01); *A21D 13/22* (2017.01); *A21D 13/41* (2017.01); *B60D 1/01* (2013.01); *F24C 1/16* (2013.01)

(58) Field of Classification Search
CPC ....... B60P 3/0257; A21D 13/41; A21D 13/22; B60D 1/01; A21B 1/52; F24C 1/16
USPC .................................. 126/276, 25 R, 29, 30
See application file for complete search history.

(56) References Cited

U.S. PATENT DOCUMENTS

| | | | | |
|---|---|---|---|---|
| 2004/0250740 | A1* | 12/2004 | Scaioli | A47B 96/18 108/161 |
| 2010/0258107 | A1* | 10/2010 | Davidson | F24B 1/207 126/276 |
| 2020/0397008 | A1* | 12/2020 | Tuch | A21D 8/06 |

* cited by examiner

*Primary Examiner* — Vivek K Shirsat
(74) *Attorney, Agent, or Firm* — Bruce A. Lev

(57) ABSTRACT

A mobile pizza cart that allows a user to move to different locations and create personalized pizzas for their customers. The mobile pizza cart incorporates stations surrounding a pizza oven that are adapted to allow a user to create the personalized pizzas in a clean and efficient manner.

11 Claims, 3 Drawing Sheets

MOBILE PIZZA CART

CROSS-REFERENCE TO RELATED APPLICATION

There are no related applications incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

This invention relates generally to mobile pizza making devices, more specifically mobile pizza trailers.

2. Description of the Related Art

Prior art mobile pizza trailers simply allow a user to drive to different locations and place pre-made pizzas within a cooking device for cooking and distributing. The customer does not have the option of ordering a personalized pizza without creating a burden and a mess.

Accordingly, the present invention overcomes the disadvantages associated with the prior art, by providing a mobile pizza cart that incorporates stations surrounding a pizza oven that are adapted to allow a user to create personalized pizzas for their customers in a clean and efficient manner.

BRIEF SUMMARY OF THE INVENTION

In view of the foregoing disadvantages inherent in the known types of mobile pizza devices or like in the prior art, the present invention provides a mobile pizza cart that allows a user to move to different locations and create personalized pizzas for their customers. As such, the general purpose of the present invention, which will be described subsequently in greater detail, is to provide a pizza cart that incorporates stations surrounding a pizza oven that are adapted to allow a user to create personalized pizzas for their customers in a clean and efficient manner with all the advantages of the prior art and none of the disadvantages.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting

BRIEF DESCRIPTION OF THE DRAWINGS

The figures which accompany the written portion of this specification illustrate embodiments according to the teachings of the present invention.

The various embodiments of the present invention will hereinafter be described in conjunction with the appended drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

Figure 1:
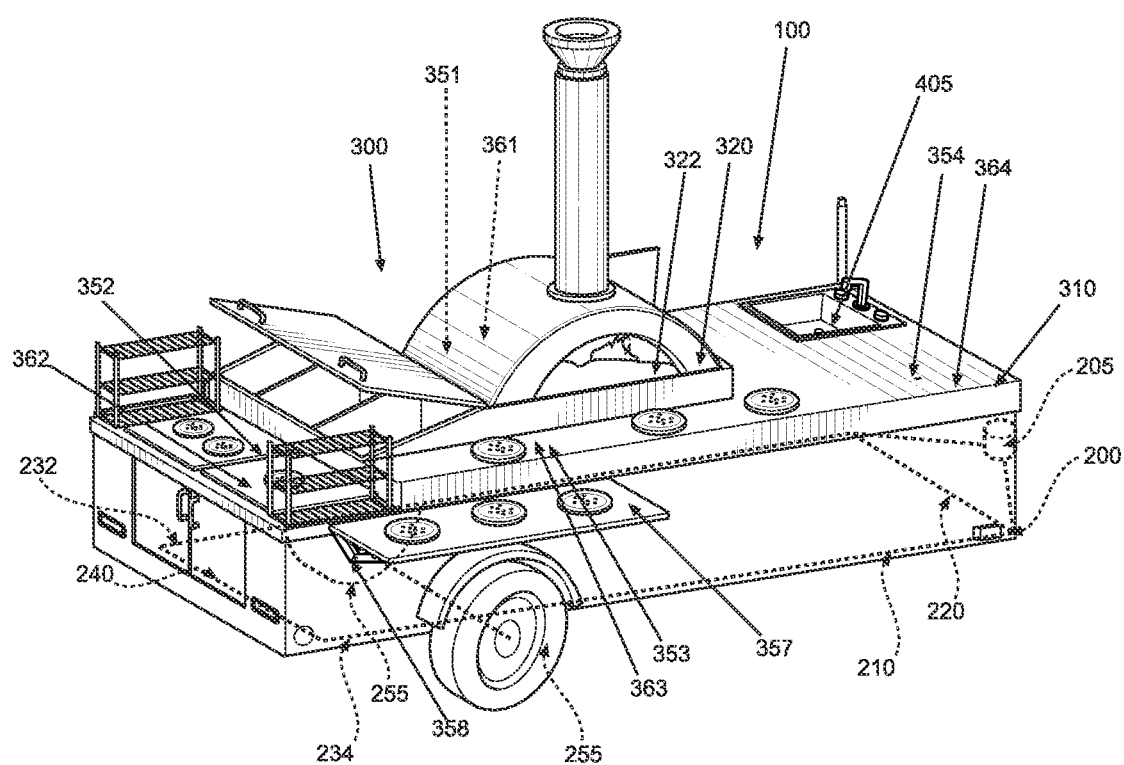
FIG. 1 shows a first perspective view of the mobile pizza cart according to the preferred embodiment of the present invention.
Figure 2:
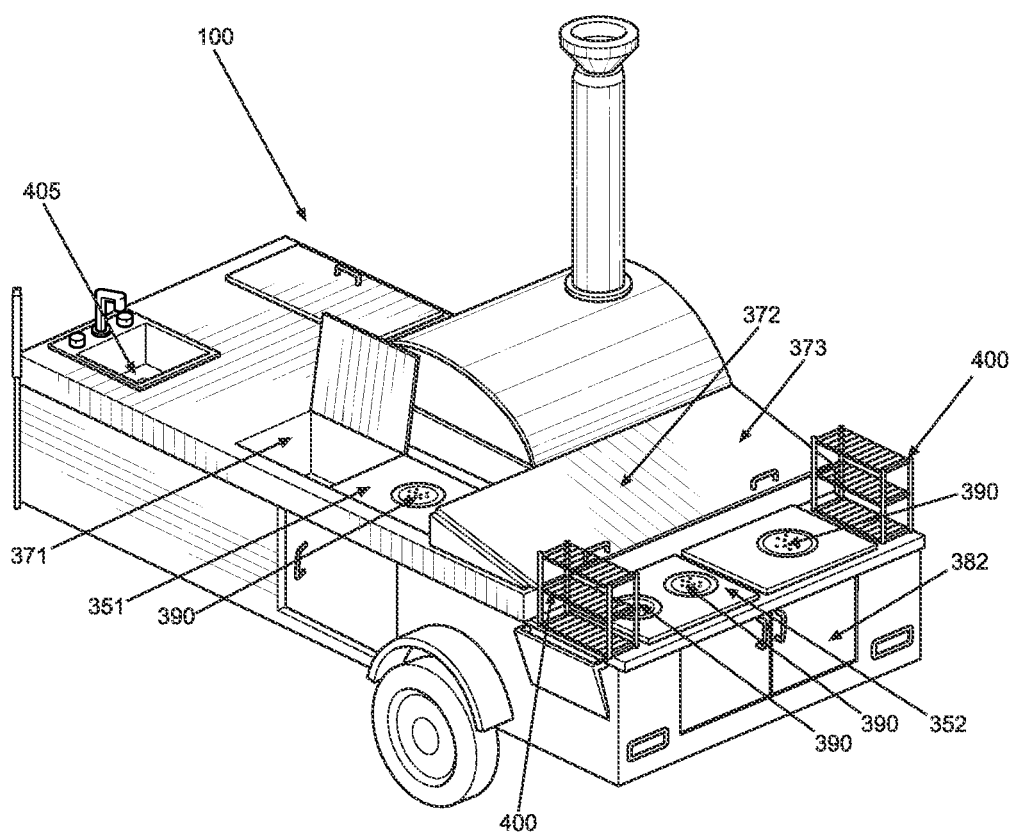
FIG. 2 shows a second perspective view of the mobile pizza cart according to the preferred embodiment of the present invention of FIG. 1.
Figure 3:
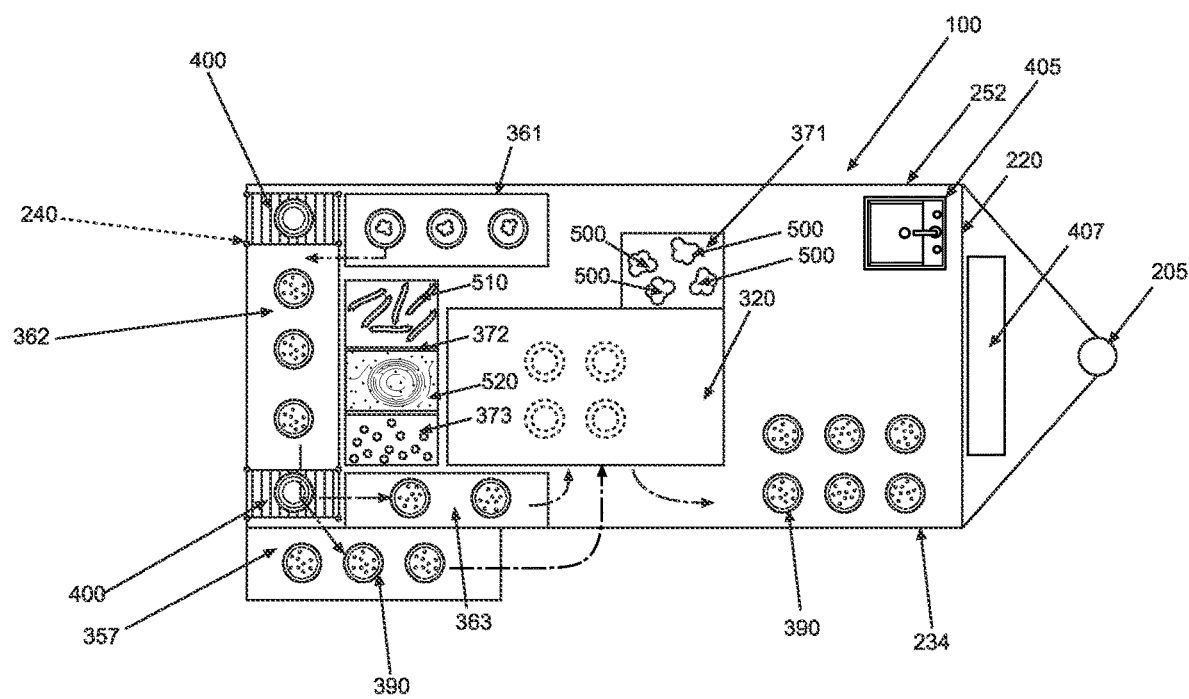
FIG. 3 shows a top view of the mobile pizza cart according to the preferred embodiment of the present invention of FIG. 1.

Turning now descriptively to drawing, referring to FIGS. 1-3, the present invention discloses a pizza cart 100 and the method of making personalized pizzas. The mobile pizza cart 100 comprises a trailer 200 including a frame 210 having a front side 220 including a hitch connector 205 attached thereto and adapted to releasably connect to a trailer hitch of a vehicle towing the trailer, a back side 240, a right side 232 connected in between the front side and the back side and is adapted to extend in a parallel direction from a driver's side of the vehicle towing the trailer, and a left side 234 connected in between the front side and the back side and is adapted to extend in a parallel direction from a passenger's side of the vehicle towing the trailer. The frame is adapted to securely retain a cooking assembly thereon. The frame further comprises at least one axle 250 attached to the frame, and at least two wheels 255 attached to the at least one axle 250 and are adapted to rotate with respect to the frame 210.

The pizza cart 100 further comprises a cooking assembly 300 comprising a main body 310 including a top wall, a bottom wall, and at least one side wall, wherein the at least one side wall is connected between the bottom wall and the top wall, wherein the bottom wall, the top wall, and the at least one side wall define an interior volume, wherein the main body 310 is attached to the frame 210 of the trailer 200;

an oven 320 including a bottom wall, a front wall formed facing the left side 234 of the frame of the trailer, a back wall formed facing the right side 232 of the frame of the trailer, a left wall formed facing the back side 240 of the frame of the trailer, and a right wall formed facing the front side 220 of the frame of the trailer, wherein the bottom wall, the front wall, the back wall, the right wall, and the left wall right wall define an interior cooking volume; a heat source 322 adapted to heat the interior cooking volume to a desired temperature; an opening formed within the front wall and is adapted to allow cooking material to be removably placed within the oven, wherein the oven is attached to a top surface of the top wall of the main body 310, wherein the bottom wall of the oven is smaller than the top wall of the main body thereby forming a plurality of station surfaces upon the top surface of the top wall of the main body, and wherein the oven is adapted to cook a pizza therein; a first station 351 located on a first station surface 361 of the top surface of the top wall of the main body and is located in between the back wall of the oven and the right side 232 of the frame of the trailer; a second station 352 located on a second station surface 362 of the top surface of the top wall of the main body and is located in between the left wall of the oven and the back side 240 of the frame of the trailer; a third station 353 located on a third station surface 363 of the top surface of the top wall of the main body and is located in between the front wall of the oven and the left side 234 of the frame of the trailer; and a fourth station 354 located on a fourth station surface 364 of the top surface of the top wall of the main body and is located in between the right wall of the oven and the front side 220 of the frame of the trailer; a pizza dough container 371 located adjacent the first station 351 and is adapted to store at least one pizza dough therein; and at least one cheese container 372 located adjacent the second station 352 and is adapted to store cheese therein; at least one pizza toppings container 373 adapted to hold pizza toppings therein; at least one pizza sauce container 374 adapted to hold pizza sauce therein located adjacent the second station 352.

When in use, as illustrated in FIG. 3, the mobile pizza cart 100 includes at least one pizza dough 500 within the pizza dough container 371; cheese 510 within the at least one cheese container 372; and pizza toppings 520 within the at least one pizza toppings container 373. The method of making a pizza using the instant mobile pizza cart 100 includes taking a pizza dough 500 out of the pizza dough container and placing it upon the first station surface 361; forming the pizza dough 500 into a desired pizza shape; moving the pizza dough 500 onto the second station surface 362; taking pizza sauce out of the at least one pizza sauce container 374 and placing it on top of the pizza dough; taking cheese 510 out of the at least one cheese container 372 and placing it on top of the pizza dough 500; taking pizza toppings 520 out of the at least one pizza topping container 373 and placing them on top of the pizza dough 500; moving the pizza dough 500 onto the third station surface 363 in preparation of being placed within the oven 320; moving the pizza dough 500 with cheese and toppings into the oven 320 for cooking into a cooked pizza; and removing the cooked pizza from the oven and placing it on the fourth station surface 364 for delivery to a customer.

The mobile pizza cart 100 may further be formed wherein the pizza dough container 371 is refrigerated by a refrigerating unit 380; the at least one cheese container 372 is refrigerated by a refrigerating unit 382; the at least one pizza toppings container 373 is refrigerated by the refrigerating unit 382 and the at least one pizza sauce container 374 is refrigerated by the refrigerating unit 382. However, these refrigeration units can be cooled by using ice therein or thereon as well. The heat source 322 may be formed to allow wood to be burned therein, or be adapted to use propane gas that can be stored in containers and placed in propane rack 407.

The mobile pizza cart 100 may also be formed wherein the first station 351 includes a plurality of platforms 390 each adapted to receive a respective pizza dough 500 thereon, and wherein each platform 390 is adapted to be placed upon and be removable from the first station surface and transferrable to the second, third, and fourth stations, and into and out of the oven. The platforms may be round, but can be any shape or size. The plurality of platforms 390 may be formed as pizza pans and formed from a material chosen from a group of materials consisting of stainless steel, copper, fiberglass, and ceramic. It should be noted that cornmeal can be used and placed on top of the station surfaces and platforms to reduce instances of pizza dough sticking thereto.

The second station 352 may include a plurality of racks 400 each adapted to receive a plurality of the platforms thereon, to thereby organize the plurality of platforms and respective pizza doughs for the addition of cheese and toppings. The plurality of racks 400 are adapted to stack the plurality of platforms and respective pizza doughs vertically with respect to one another.

The mobile pizza cart 100 may also be formed wherein the third station 353 further includes a pivoting platform 357 adapted to extend their respective surface areas, and wherein each pivoting platform includes a bracket 358 to releasably hold the respective pivoting platform in a horizontal position. Furthermore, a sink 405 may also be included, along with a propane tank holding container 407.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:

1. The method of making a pizza comprising the steps of:
providing a trailer including;
  a frame including:
    a front side including:
      a hitch connector attached thereto and adapted to releasably connect to a trailer hitch of a vehicle towing said trailer;
    a back side;
    a right side;
      wherein said right side is connected in between said front side and said back side and is adapted to extend in a parallel direction from a driver's side of said vehicle towing said trailer; and
    a left side;
      wherein said left side is connected in between said front side and said back side and is adapted to extend in a parallel direction from a passenger's side of said vehicle towing said trailer;
    wherein said frame is adapted to securely retain a cooking assembly thereon;
  at least one axle;
    wherein said at least one axle is attached to said frame; and at least two wheels;
   wherein said at least two wheels are attached to said at least one axle and are adapted to rotate with respect to said frame;
providing a cooking assembly comprising;
   a main body including:
      a top wall;
      a bottom wall; and
      at least one side wall;
         wherein said at least one side wall is connected between said bottom wall and said top wall;
         wherein said bottom wall, said top wall, and said at least one side wall define an interior volume;
      wherein said main body is attached to said frame of said trailer;
   an oven including:
      a bottom wall;
      a front wall;
         wherein said front wall is formed facing said left side of said frame of said trailer;
      a back wall;
         wherein said back wall is formed facing said right side of said frame of said trailer;
      a left wall;
         wherein said left wall is formed facing said back side of said frame of said trailer; and
      a right wall;
         wherein said right wall is formed facing said front side of said frame of said trailer;
      wherein said bottom wall, said front wall, said back wall, said right wall, and said left wall right wall define an interior cooking volume;
      a heat source;
         wherein said heat source is adapted to heat said interior cooking volume to a desired temperature;
      an opening;
         wherein said opening is formed within said front wall and is adapted to allow cooking material to be removably placed within said oven; and
      wherein said oven is attached to a top surface of said top wall of said main body
      wherein said bottom wall of said oven is smaller than said top wall of said main body thereby forming a plurality of station surfaces upon said top surface of said top wall of said main body; and
      wherein said oven is adapted to cook a pizza therein;
   a first station;
      wherein said first station is located on a first station surface of said top surface of said top wall of said main body and is located in between said back wall of said oven and said right side of said frame of said trailer;
   a second station;
      wherein said second station is located on a second station surface of said top surface of said top wall of said main body and is located in between said left wall of said oven and said back side of said frame of said trailer;
   a third station;
      wherein said third station is located on a third station surface of said top surface of said top wall of said main body and is located in between said front wall of said oven and said left side of said frame of said trailer;
   a fourth station;
      wherein said fourth station is located on a fourth station surface of said top surface of said top wall of said main body and is located in between said right wall of said oven and said front side of said frame of said trailer;
   a pizza dough container;
      wherein said pizza dough container is located adjacent said first station and is adapted to store at least one pizza dough therein;
   at least one pizza sauce container;
      wherein said at least one pizza sauce container is located adjacent said second station and is adapted to store pizza sauce therein;
   at least one cheese container;
      wherein said at least one cheese container is located adjacent said second station and is adapted to store cheese therein;
   at least one pizza toppings container;
      wherein said at least one pizza toppings container is located adjacent said second station and is adapted to store pizza toppings therein;
providing at least one pizza dough within said pizza dough container;
providing cheese within said at least one cheese container;
providing pizza toppings within said at least one pizza toppings container;
taking a pizza dough out of said pizza dough container and placing it upon said first station surface;
forming said pizza dough into a desired pizza shape;
moving said pizza dough onto said second station surface;
taking pizza sauce out of said at least one pizza sauce container and placing it on top of said pizza dough;
taking cheese out of said at least one cheese container and placing it on top of said pizza dough;
taking pizza toppings out of said at least one pizza topping container and placing them on top of said pizza dough;
moving said pizza dough onto said third station surface in preparation of being placed within said oven;
moving said pizza dough with cheese and toppings into said oven for cooking into a cooked pizza; and
removing said cooked pizza from said oven and placing on said fourth station surface for delivery.

2. The method of making a pizza of claim 1, wherein said pizza dough container is refrigerated.

3. The method of making a pizza of claim 1, wherein said at least one cheese container is refrigerated.

4. The method of making a pizza of claim 1, wherein said at least one pizza toppings container is refrigerated.

5. The method of making a pizza of claim 1, wherein said heat source is formed to allow wood to be burned therein.

6. The method of making a pizza of claim 1, wherein said heat source is adapted to use propane gas.

7. The method of making a pizza of claim 1, wherein said first station includes a plurality of platforms each adapted to receive a respective pizza dough thereon; and wherein said platform is adapted to be placed upon and be removable from said first station surface and transferrable to said second, third, and fourth stations, and into and out of said oven.

8. The method of making a pizza of claim 7, wherein said plurality of platforms are formed from a material chosen from a group of materials consisting of stainless steel, copper, fiberglass, and ceramic.

9. The method of making a pizza of claim 7, wherein said second station includes a plurality of racks each adapted to receive a plurality of said platforms thereon, to thereby organize said plurality of said platforms and respective pizza doughs for the addition of cheese and toppings.

10. The method of making a pizza of claim 9, wherein said plurality of racks are adapted to stack said plurality of said platforms and respective pizza doughs vertically with respect to one another.

11. The method of making a pizza of claim 1, wherein said third station further includes a pivoting platform adapted to extend said third station surface area; and said pivoting platform includes a bracket to releasably hold said pivoting platform in a horizontal position.

* * * * *